(12) United States Patent
Suzuki

(10) Patent No.: US 7,079,271 B2
(45) Date of Patent: Jul. 18, 2006

(54) COMMUNICATION TERMINAL

(75) Inventor: Yuji Suzuki, Toyonaka (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 829 days.

(21) Appl. No.: 09/927,178

(22) Filed: Aug. 8, 2001

(65) Prior Publication Data
US 2002/0054341 A1    May 9, 2002

(30) Foreign Application Priority Data
Aug. 17, 2000 (JP) ............................. 2000-247717
Aug. 17, 2000 (JP) ............................. 2000-247718
Aug. 17, 2000 (JP) ............................. 2000-247719

(51) Int. Cl.
G06F 15/00 (2006.01)
G06K 1/00 (2006.01)
H04N 1/00 (2006.01)
H04N 1/40 (2006.01)
H04N 1/32 (2006.01)

(52) U.S. Cl. ..................... 358/1.15; 358/404; 358/444; 358/448; 358/468

(58) Field of Classification Search ............... 358/1.15, 358/402, 434, 468, 437, 444, 296, 438, 439, 358/404, 448; 379/100.01, 100.06, 100.12; 399/26, 27, 29, 24

See application file for complete search history.

(56) References Cited

U.S. PATENT DOCUMENTS

| 4,646,160 A |   | 2/1987  | Iizuka et al.              |
|-------------|---|---------|----------------------------|
| 4,920,427 A | * | 4/1990  | Hirata ............... 358/437 |
| 5,377,017 A |   | 12/1994 | Lam                        |
| 5,675,421 A | * | 10/1997 | Ouchi ............... 358/402 |
| 5,726,768 A | * | 3/1998  | Ishikawa et al. ........ 358/442 |
| 5,778,279 A | * | 7/1998  | Kawai et al. ........... 399/42 |
| 6,055,067 A | * | 4/2000  | Matsuda et al. ........ 358/468 |

FOREIGN PATENT DOCUMENTS

| EP | 0 901 275   |   | 3/1999  |
|----|-------------|---|---------|
| JP | 01318456 A  | * | 12/1989 |

* cited by examiner

Primary Examiner—Kimberly Williams
Assistant Examiner—Charlotte M. Baker
(74) Attorney, Agent, or Firm—Hogan & Hartson LLP (57) ABSTRACT

A communication terminal (1) having a network control unit for closing and releasing a circuit, a memory for registering a communication job, and a recording unit (50) for recording image data. The communication terminal (1) further has a control unit (10) which closes the circuit by the network control unit (110) to make acceptance of an incoming call impossible when the recording unit (50) fails to operate, and which releases the circuit temporarily by the network control unit (110) in the case of calling or when the communication job registered in the program memory reaches calling time.

20 Claims, 9 Drawing Sheets

COMMUNICATION TERMINAL

CROSS REFERENCES TO RELATED APPLICATONS

This application claims priority under 35 USC 119 of Japanese Patent Application Nos. 2000-247717, 2000-247718, and 2000-247719 filed in JPO on Jun. 30, 2000, the entire disclosure of which is incorporated herein by reference.

BACKGROUND OF THE INVENTION

1. Field of the Invention

The present invention relates to a communication terminal such as a facsimile device with a copying function and more particularly to an operation when a recording unit fails to operate on the ground of recording paper or a toner running out, or a photoconductive drum needing a replacement.

2. Description of the Related Art

In a conventional communication terminal such as a facsimile device with a copying function, when the recording unit fails to operate on the ground of recording paper or a toner running out, or a photoconductive drum needing a replacement, the operational status is displayed on the display. In accordance with the display, when an operator replenishes recording paper or a toner, or when a service personnel exchanges the photoconductive drum, the recording unit becomes operable.

However, even if the recording unit fails to operate likewise, it is possible to release the circuit to carry out a facsimile transmission. Therefore, it is desired to set the transmission program (schedule) including immediate transmission or the polling program, and register the jobs of the transmission program or the polling program. When the registered job reaches the calling time, it is desired to call the other end according to the job.

There is a possibility for a facsimile receiving to be carried out due to the detection of an incoming call when the circuit is released. However, since the recording unit fails to operate at the time being, the facsimile receiving cannot be carried out. Therefore, there is a necessity that the facsimile receiving should not be carried out when the circuit is released.

There are a transmission certificate and a receipt certificate for confirming that a facsimile communication between a transmission side and a receiving side has been carried out normally. That is, when a facsimile transmission is carried out normally and a setting of the facsimile device has been made such that the transmission certificate is output, the transmission certificate is recorded on recording paper by the facsimile device of the transmitting side. When a setting of the facsimile device has been made such that the transmitting side requests a receipt certificate, and the facsimile device of the receiving side has the receipt certificate stored in the image memory, the receipt certificate from the receiving side is received by the transmitting side.

However, when the recording unit is operable and the facsimile transmission is carried out and the recording unit becomes non-operable due to the copying operation carried out in the midst of the facsimile transmission, the transmission certificate or the receipt certificate cannot be recorded. Therefore, when the recording unit becomes non-operable in the midst of the facsimile transmission, it has been impossible to confirm quickly whether or not the facsimile communication with the receiving side has been carried out normally.

SUMMARY OF THE INVENTION

In view of the foregoing, it is an object of the present invention to provide a communication terminal which is capable of calling the other end according to the job when the job has reached the calling time, even if the recording unit fails to operate.

It is another object of the present invention to provide a communication terminal which is capable of carrying out facsimile transmission even if the recording unit fails to operate.

It is a still further object of the present invention to provide a communication terminal which is capable of confirming a communication result quickly even if the recording unit becomes non-operable in the midst of transmission.

According to one aspect of the present invention, even when the recording means fails to operate, in the case a job reaches the calling time, the other end based on the job can be called out.

According to another aspect of the present invention, even when the recording means fails to operate, the facsimile transmission can be carried out.

DETAILED DESCRIPTION OF THE INVENTION

Figure 9:
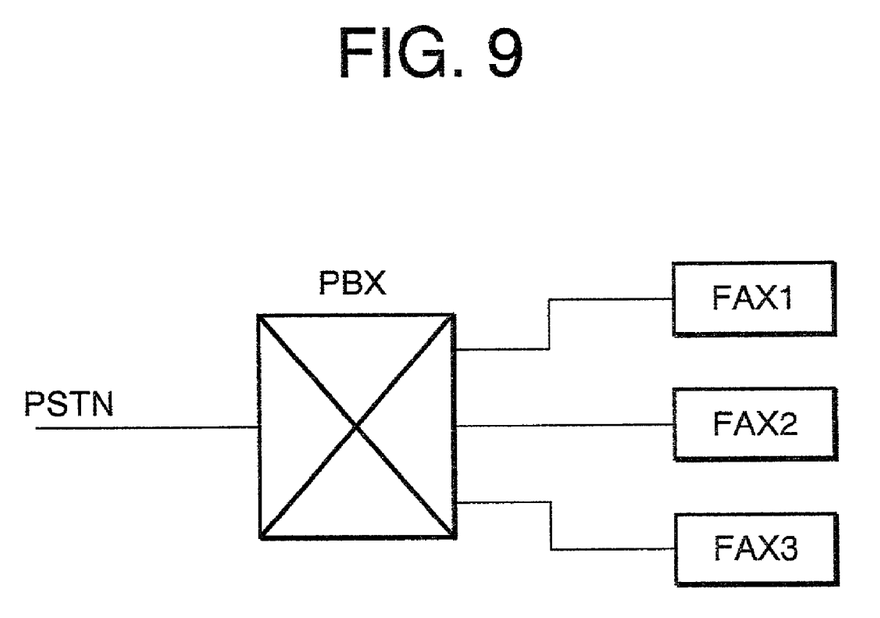
FIG. 9 is a block diagram showing the whole system including the facsimile device shown in FIG. 1.

FIG. 9 is a diagram which shows an environment where a facsimile device with a copying function of the present invention is used.

A plurality of facsimile devices are connected to the PBX (Private Branch Exchange). For example, when the facsimile 1 becomes incapable of recording, the facsimile 1 closes the circuit connected to the PBX (forms a current loop with the PBX). Then, the PBX judges that the facsimile is in use (the facsimile is trying to call) since the facsimile is closing the circuit. Thus, the facsimile 1 is not called by an incoming call from the PSTN (Public Switched Telephone Network). The PBX is capable of calling another facsimile 2 (capable of recording a received call) instead of the facsimile 1.

A facsimile device with a copying function as an embodiment of a communication terminal of the present invention will now be described with reference to the accompanying drawings.

Figure 1:
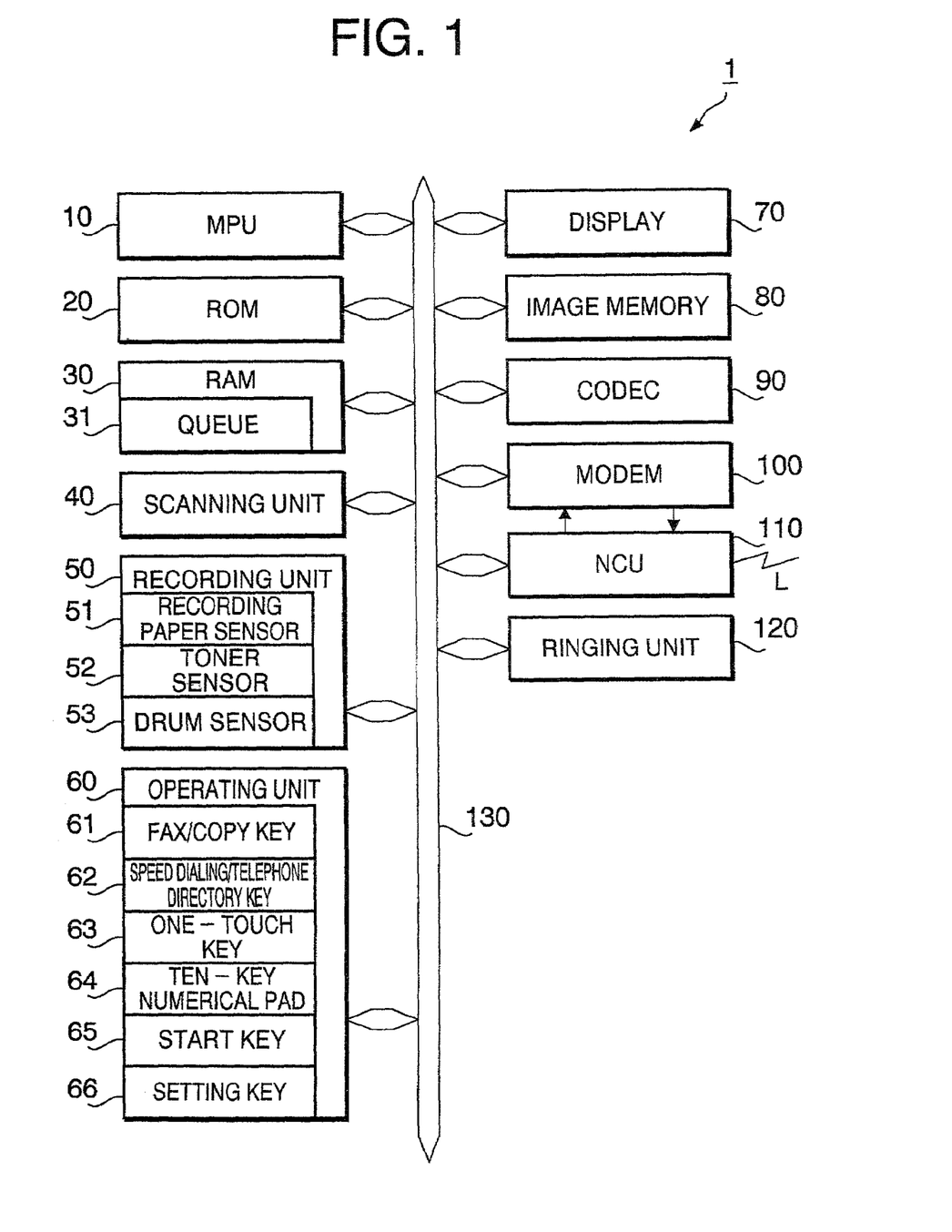
FIG. 1 is a block diagram showing the composition of a facsimile device with a copying function.

Referring to FIG. 1, the facsimile device 1 with a copying function includes an MPU 10 which may be called a control unit 10, ROM 20, RAM 30, a scanning unit 40, a recording unit 50, an operating unit 60, a display unit 70, an image memory 80, a codec 90, a modem 100, NCU 110, and a ringing unit 120, and each unit is connected to one another via a bus 130.

The MPU 10 (the control unit) controls each unit which composes the facsimile device 1 with a copying function. The ROM 20 stores a program to control the facsimile device 1 with a copying function. The RAM 30 stores various kinds of information related to the facsimile device 1 with a copying function. The RAM 30 is also provided with a queue 31 which stores a job generated from the facsimile device 1 with a copying function. The RAM 30 stores a transmission certificate and an error message as well.

The scanning unit 40 scans an image on an original line-by-line, changes the scanned image data of the read image into the binary code of black and white, and outputs the image data of one line in the binary code to the codec 90 successively.

The recording unit 50 includes an electro photographic image printer, and records, on recording paper, a received image data from the FAX operation and an image data scanned by the scanning unit 40 in the copying operation. Moreover, the recording unit 50 records, on recording paper, the communication result of a transmission certificate, a receipt certificate, and an error message. Furthermore, the recording unit 50 is provided with a recording paper sensor 51, a toner sensor 52, and a drum sensor 53. The recording paper sensor 51 detects the presence or the absence of recording paper stowed in recording paper cassette, and outputs the detected signal to the MPU 10 (the control unit).

A toner sensor 52 detects the presence or the absence of a toner stowed in a toner case, and outputs the detected signal to the MPU 10. The drum sensor 53 detects the rotation of the photoconductive drum and outputs the detected signal to the MPU 10. Then, the MPU 10 calculates the total rotating hour of the photoconductive drum with reference to the detected signal from the drum sensor 53, and judges whether or not it is the time to replace the photoconductive drum.

The operating unit 60 is provided with various kinds of operating keys such as a FAX/copy key 61, a speed dialing/ telephone directory key 62, a one-touch key 63, a ten-key numerical pad 64 (including *, # keys), a start key 65, and a setting key 66. The FAX/copy key 61 is used for selecting the FAX mode or the copy mode. The speed dialing/ telephone directory key 62 is used for designating a pre-registered telephone number of the other end (including a FAX number) with a speed dial number, and for designating the telephone number of the other end by searching the pre-registered other end in the telephone directory. The one-touch key 63 is used for selecting the pre-registered other end with a single keystroke. The ten-key numerical pad 64 is used for inputting the telephone number of the other end, or the number of copies, etc. The start key 65 is used for starting the reading operation of a FAX transmitting original or a copy original. The setting key 66 is used for making the following settings: a setting of the transmission program (schedule) for programming the date and time of transmission; a setting of the polling program for programming the polling; a setting of the calling interruption to interrupt the ringing tone; a setting for making a transmission certificate; and a setting to request the communication terminal on the receiving side for a receipt certificate.

The display unit 70 includes LCD etc. displays various kinds of information, such as an operational status of the facsimile device 1 with a copying function. Moreover, the display unit 70 displays the transmission certificate, the receipt certificate, and the error message.

The image memory 80 temporarily stores the received image data or the image data of the image scanned at the scanning unit 40. Moreover, the image memory 80 stores the receipt certificate made in the communication terminal of the receiving side. The codec 90 performs a band compression and encoding for transmitting the image data input from the scanning unit 40 by the method such as MH, MR, MMR, or JBIG. The codec 90 decrypt the received image data.

The modem 100 modulates and demodulates the transmission and received data according to V.17, V.27ter, V.29, etc. on the basis of the facsimile transmission control procedure according to ITU-T Recommendation T.30. The NCU 110 closes and releases the telephone line L, and is provided with the function to detect the transmitting of the dial signal corresponding to the telephone number of the other end and incoming calls. The ringing unit 120 rings a ringing tone in accordance with a calling signal to inform that the telephone has received a call.

Figure 2:
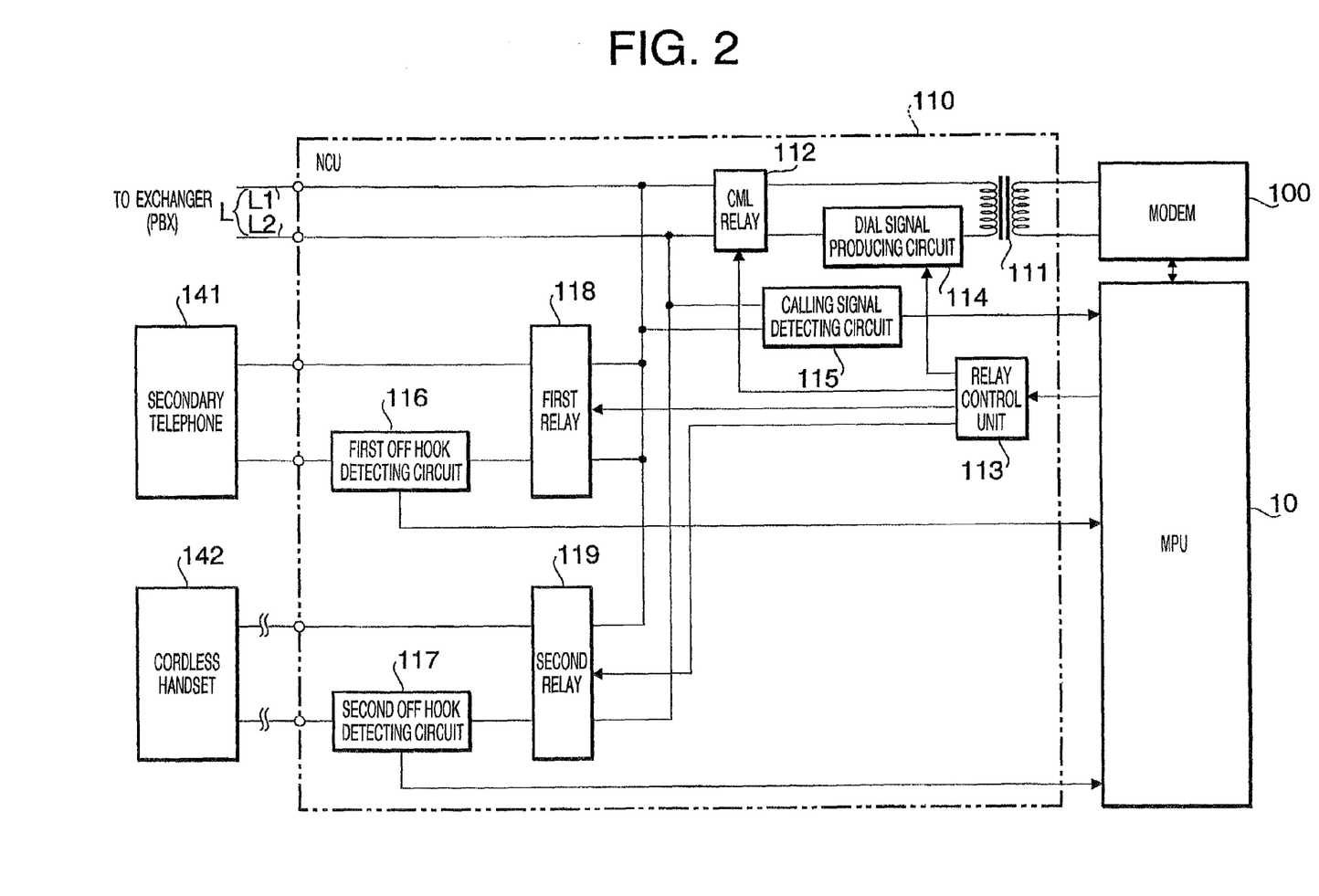
FIG. 2 is a block diagram showing the composition of an NCU (network control unit) of the facsimile device shown in FIG. 1.

The composition of the NCU 110 will now be described. Referring to FIG. 2, the modem 100 is connected to the telephone line L (L1, L2) via a transformer 111. The CML relay 112, placed between the telephone line L and the modem 100, closes and releases the telephone line L by the control from the relay control unit 113. The telephone line L forms a current loop via the modem 100 in accordance with the closing of the telephone line L, and releases the current loop due to the releasing of the circuit. The dial signal producing circuit 114 is placed between the transformer 111 and the CML relay 112, and produces a dial signal by the control from the relay control unit 113.

A calling signal detecting circuit 115, connected to the telephone line L, detects a 16 (Hz) calling signal on the telephone line L and outputs the detected signal to the MPU 10. The first and the second off-hook detecting circuits 116 and 117 detects respectively the off-hook (a situation which a handset is picked up) of a secondary telephone 141 and a cordless handset 142, and outputs the detected signal to the MPU 10.

The first and the second relays 118, 119 are provided to connect the secondary telephone 141 and the cordless handset 142 respectively to the telephone line L. The relay control unit 113 controls the CML relay 112, the dial signal producing circuit 114, the first and the second relays 118, 119 on the basis of the control from the MPU 10.

Referring to the flow charts shown in FIG. 3 to FIG. 5, the operation of the facsimile device 1 with a copying function as an first embodiment of the present invention, when the recording unit 50 fails to operate and the image memory 80 is exhausted, will now be described. This operation is carried out by the control of the MPU 10 according to the program stored in the ROM 20.

In step S1, the presence or the absence of recording paper is checked in accordance with the detected signal from recording paper sensor 51. In the absence of recording paper, it proceeds to step S6. On the other hand, in the presence of recording paper, it proceeds to step S2.

In step S2, the presence or the absence of a toner is checked in accordance with the detected signal from a toner sensor 52. In the absence of a toner, it proceeds to S6. On the other hand, in the presence of a toner, it proceeds to step S3.

In step S3, it is judged whether or not it is the time to replace the photoconductive drum, in accordance with the detected signal from the drum sensor 53. When it is the time to replace the photoconductive drum, it proceeds to step S6. On the other hand, when it is not yet the time to replace the photoconductive drum, it proceeds to step S4.

In step S4, it is judged whether or not an incoming call has been detected, in accordance with the detected signal from the calling signal detecting circuit 115. If an incoming call is detected, it proceeds to step S5. When CNG signal, which shows that the signal is from a facsimile device, is transmitted from the other end, and the facsimile communication on the basis of the facsimile transmission control procedure is started, the image data is received and the received image data is recorded on recording paper by the recording unit 50 in step S5. When the recording of the recording unit 50 is completed, it proceeds to the step S1. In other words, when there are recording paper and a toner, and the photoconductive drum has yet to reach the time to be replaced, the processes of the step S1 through S5 are repeated. Meanwhile, when an incoming call is not detected, it proceeds to step S10.

When the recording unit 50 becomes non-operable in such case that recording paper or a toner has run out in the steps S1 and S2, or the photoconductive drum has reached the time to be replaced in the step S3, it is judged whether or not the image memory 80 is exhausted in step S6. In the case the memory is exhausted, it proceeds to step S10. On the other hand, if the memory is not exhausted, it proceeds to step S7.

In step S7, it is judged whether or not an incoming call has been detected in accordance with the detected signal from the calling signal detecting circuit 115. When an incoming call is detected, it proceeds to step S8. When the CNG signal, which shows that the call is from a facsimile device, is transmitted from the other end and the facsimile communication on the basis of the facsimile transmission control procedure is started, the so-called alternative memory receiving is carried out in step S8. Once the alternative memory receiving is completed, it proceeds to the step S1. In other words, even when the recording unit 50 becomes non-operable in such case that recording paper or a toner has run out, or the photoconductive drum has reached the time to be exchanged, the alternative memory receiving is carried out until the image memory 80 is exhausted. On the other hand, when the incoming call is not detected, it proceeds to step S10.

In step S9, it is judged whether or not there is the setting for the transmission program according to the operation of the setting key 66. When there is the setting for the transmission program, it proceeds to step S11. On the other hand, when there is not the setting for the transmission program, it proceeds to step S21 shown in FIG. 4.

In step S11, the transmitting original is placed on the scanning unit 40, and the completion of the setting of the transmission program is being waited. More specifically, the items such as "the date and time of transmission", "the FAX number of the other end", "the FAX type such as confidential or multiple address", are given as the examples for the setting for the transmission program. In the case that the item "the date and time of transmission" is not selected for the setting of the transmission program, the transmission is judged as an immediate transmission.

In step S12, the operation of the start key 65 is being waited. In step S13, a transmission program job is registered at the queue 31 in accordance with the operation of the start key 65 in the step S12.

Figure 4:
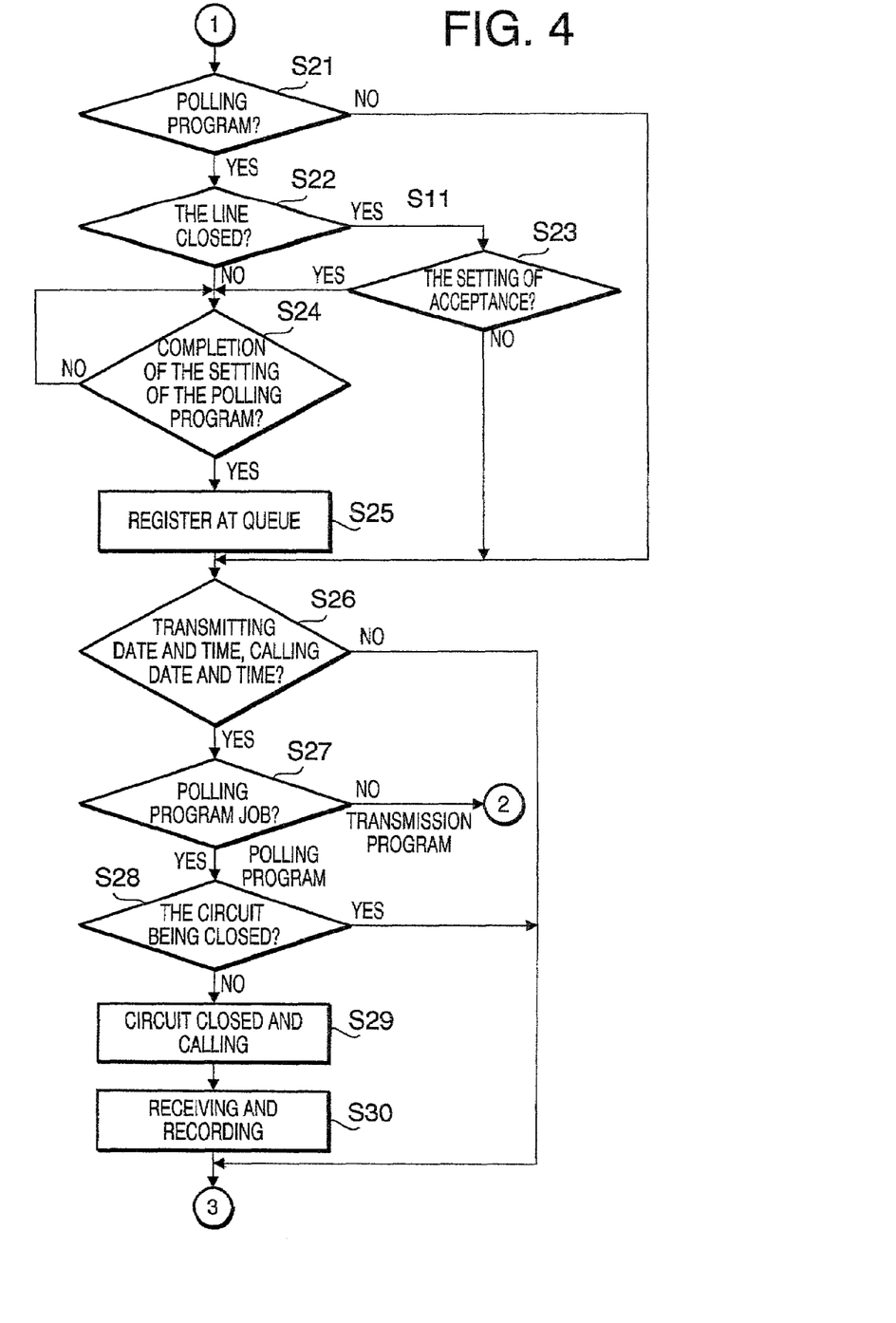
FIG. 4 is a flow chart following the flow chart of FIG. 3.
Figure 5:
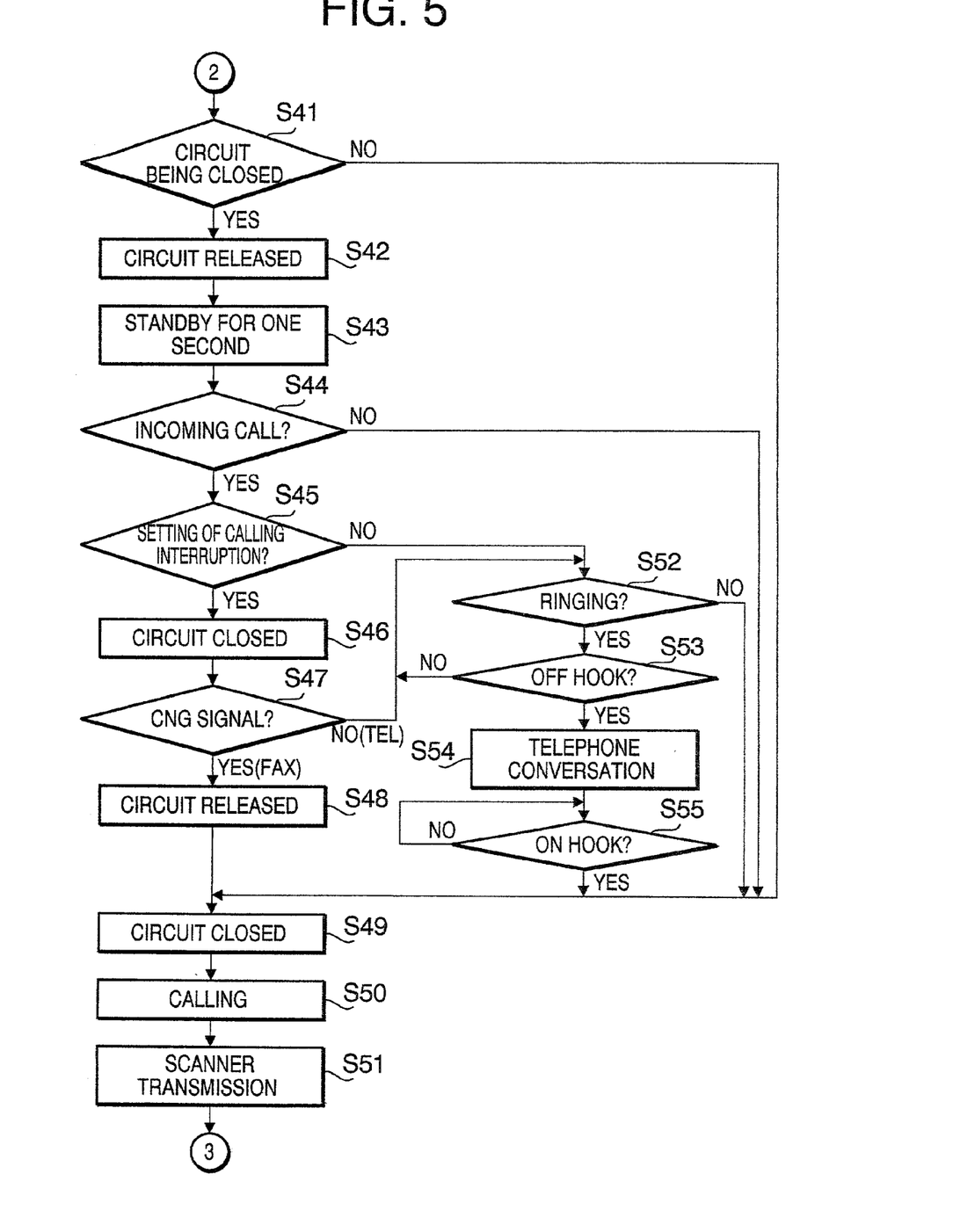
FIG. 5 is a flow chart following the flow chart of FIG. 4.

In step S21 as shown in FIG. 4, it is judged whether or not there is the setting of the polling program according to the operation of the setting key 66. When there is the setting for the polling program, it proceeds to step 22. On the other hand, when there is not the setting for the polling program, it proceeds to step S26.

In step S22, it is judged whether or not the telephone line L is closed due to the malfunction of the recording unit 50. It is judged whether or not the telephone line L is closed here, since there are cases in which the cause for the malfunction of the recording unit 50 has been solved and the telephone line L has been released. Then, when the telephone line L is closed, it proceeds to step S23. On the other hand, when the telephone line L is not closed, in other words, when the telephone line L is released, it proceeds to step S24.

In step S23, it is judged whether or not there is the setting which accepts the polling program in accordance with the operation of the setting key 66. When there is the setting for accepting the polling program, it proceeds to step S24. On the other hand, when there is not the setting for accepting the polling program, it proceeds to step S26.

In step S24, the completion of the setting of the polling program is being waited. More specifically, the items such as "the date and time of calling", "the FAX number of the other end" are given as the examples for the setting of the polling program.

In step S25, the polling program job is registered in the queue 31. In step S26, it is judged whether or not the transmission program job or the polling program job registered in the queue 31 has reached the transmitting date and time of the transmission program or the calling date and time of the polling program respectively. When the transmitting date and time of the transmission program or the calling date and time of the polling program has been reached, it proceeds to step S27. On the other hand, when it is not the transmitting date and time of the transmission program or the calling date and time of the polling program, it returns to step S1 as shown in FIG. 3.

In step S27, it is judged whether or not the job is the polling program job that has reached the transmitting date and time of the transmission program or the calling date and time of the polling program. When the job is the polling program job, it proceeds to step S28. On the other hand, when the job is not the polling program job, in other words, when the job was the transmission program job (including immediate transmission) that has reached the transmitting date and time of the transmission program or the calling date and time of the polling program, it proceeds to step S41 as shown in FIG. 5.

In step S28, it is judged whether or not the telephone line L is closed due to the malfunction of the recording unit 50. This is based on the same reason as the step S22. When the telephone line L is closed, it returns to step S1 as shown in FIG. 3. On the other hand, when the telephone line L is not closed, in other words, when the telephone line L is released, or when the cause of the malfunction of the recording unit 50 has been solved, it proceeds to step S29.

In step S29, the telephone line L is closed by the CML relay 112, and the FAX number of the other end selected in the setting of the polling program in the step S24 is called.

In step S30, the image data from the other end is received and the received image data is recorded on recording paper in the recording unit 50. In step S41 as shown in FIG. 5, it is judged whether or not the telephone line L is closed due to the malfunction of the recording unit 50. This is also based on the same reason as in step S22. When the telephone line L is closed, it proceeds to step S42. On the other hand, when the telephone line L is not closed, in other words, when the telephone line L is released, it proceeds to step S49.

In step S42, the telephone line L is released by the CML relay 112. In step S43, the waiting state continues for one second, with the telephone line L being released. In other words, when the telephone line L is kept closed for a long period of time, the exchanger (PBX) recognizes that the facsimile device 1 with a copying function is using the telephone line L, and stops accepting the dial signal from the dial signal producing circuit 114 thereafter. This is the reason why the telephone line L is released for one second by the CML relay 112.

In step S44, it is judged whether or not an incoming call has been detected in accordance with the detected signal from the calling signal detecting circuit 115. If the incoming call is detected, it proceeds to step S45. On the other hand, if the incoming call is not detected, it proceeds to step S49.

In step S45, it is judged whether or not there is the setting for the calling interruption to interrupt a ringing tone according to the operation of the setting key 66. If the calling interruption is selected, it proceeds to step S46. On the other hand, if the calling interruption is not selected, it proceeds to step S52.

In step S46, the telephone line L is closed by the CML relay 112. In step S47, it is judged whether or not the CNG (calling tone) signal which is sent out in the case the calling side is using the facsimile, is received by the modem 100. In other words, it is judged whether or not there has been a receiving by the facsimile communication when the telephone line L was released in the step S42. When the CNG signal is received, it is judged that the receiving was a FAX receiving by the facsimile communication and it proceeds to step S48. On the other hand, when the CNG signal is not received, it is judged that the incoming call was made by a telephone and it proceeds to step S52.

In step S48, the telephone line L is released by the CML relay 112 since the recording unit 50 fails to operate. In other words, even when the receiving is a FAX receiving of the facsimile communication, since the recording unit 50 fails to operate and the alternative memory receiving cannot be carried out, the telephone line L is released forcibly by the CML relay 112.

In step S49, the telephone line L is closed by the CML relay 112. That is, the telephone line L is closed by the CML relay 112 since the job according to the transmission program in the step S10 has reached the date and time of transmission.

Figure 3:
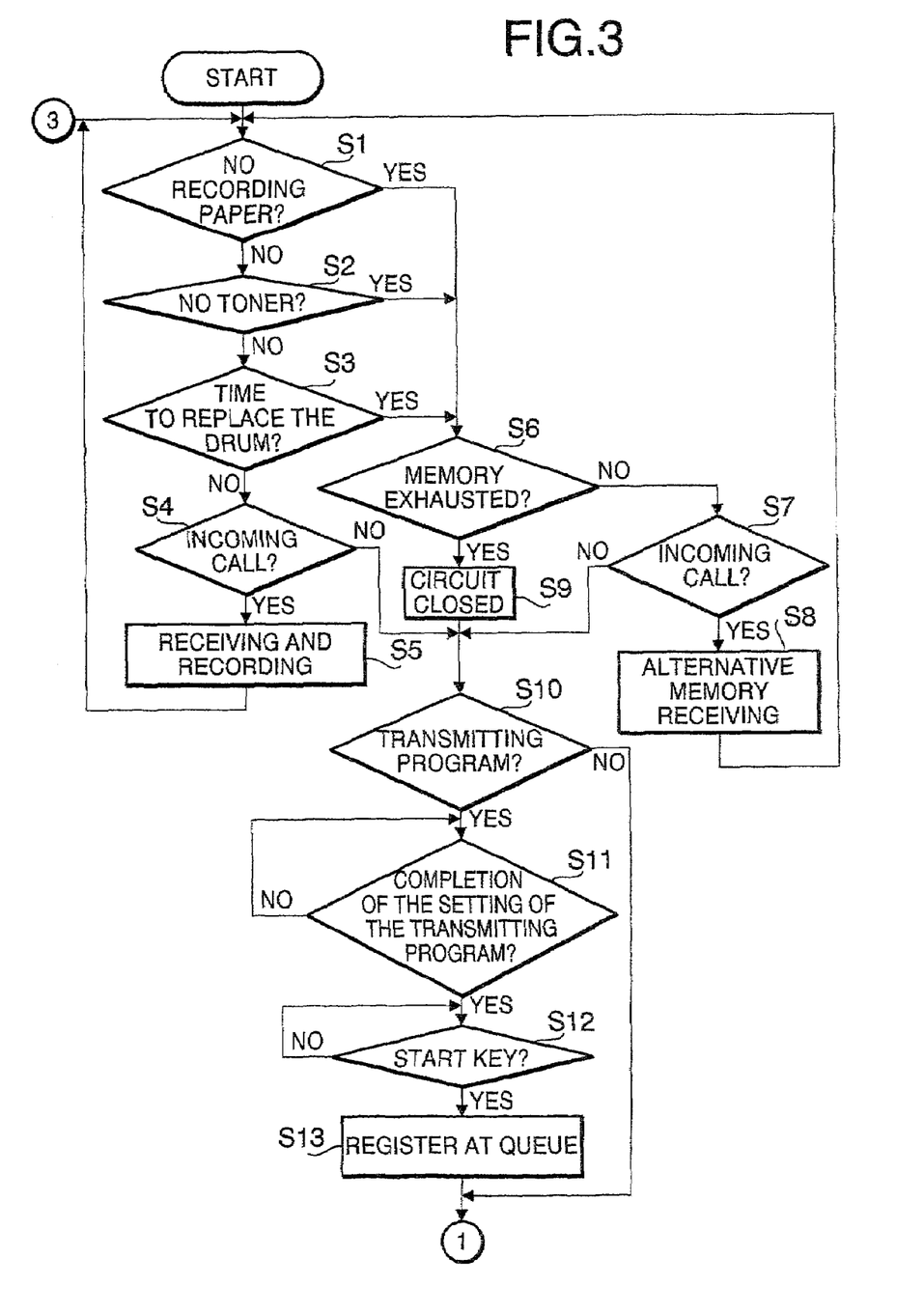
FIG. 3 is a flow chart showing the operation of the facsimile device with a copying function shown in FIG. 1 in the event that a recording unit fails to operate and the image memory is exhausted.

In step S50, regarding the setting of the transmission program in step S11 shown in FIG. 3, the FAX number of the selected other end is called out.

In step S51, the transmitting original placed on the scanning unit 40 is scanned and transmitted. In other words, after the image data scanned by the scanning unit 40 is compressed and encrypted by the codec 90, the image data is directly sent to the other end without being stored once in the image memory 80.

When the calling interruption is not selected, or when the CNG signal is not received, in step S52, it is judged whether or not the calling tone according to the calling signal is ringing from the ringing unit 120. When ringing, it proceeds to step S53. On the other hand, when not ringing, it proceeds to step S49.

In step S53, it is judged whether or not the secondary telephone 141 or the cordless handset 142 has been off hooked according to the detected signal from the first and the second off-hook detecting circuits 116 and 117. If it has been off hooked, it proceeds to step S54. On the other hand, if it is not off hooked, it returns to step S52 in which a calling tone from the ringing unit 120 is kept ringing.

In step S54, a telephone conversation with the other end is held according to the off-hook status of the secondary telephone 141 or the cordless handset 142. In step S55, the secondary telephone 141 or the cordless handset 142 are being waited to be on-hooked according to the detecting signal from the first and the second off-hook detecting circuits 116 and 117. If it is on-hooked, it proceeds to step S49.

Figure 6:
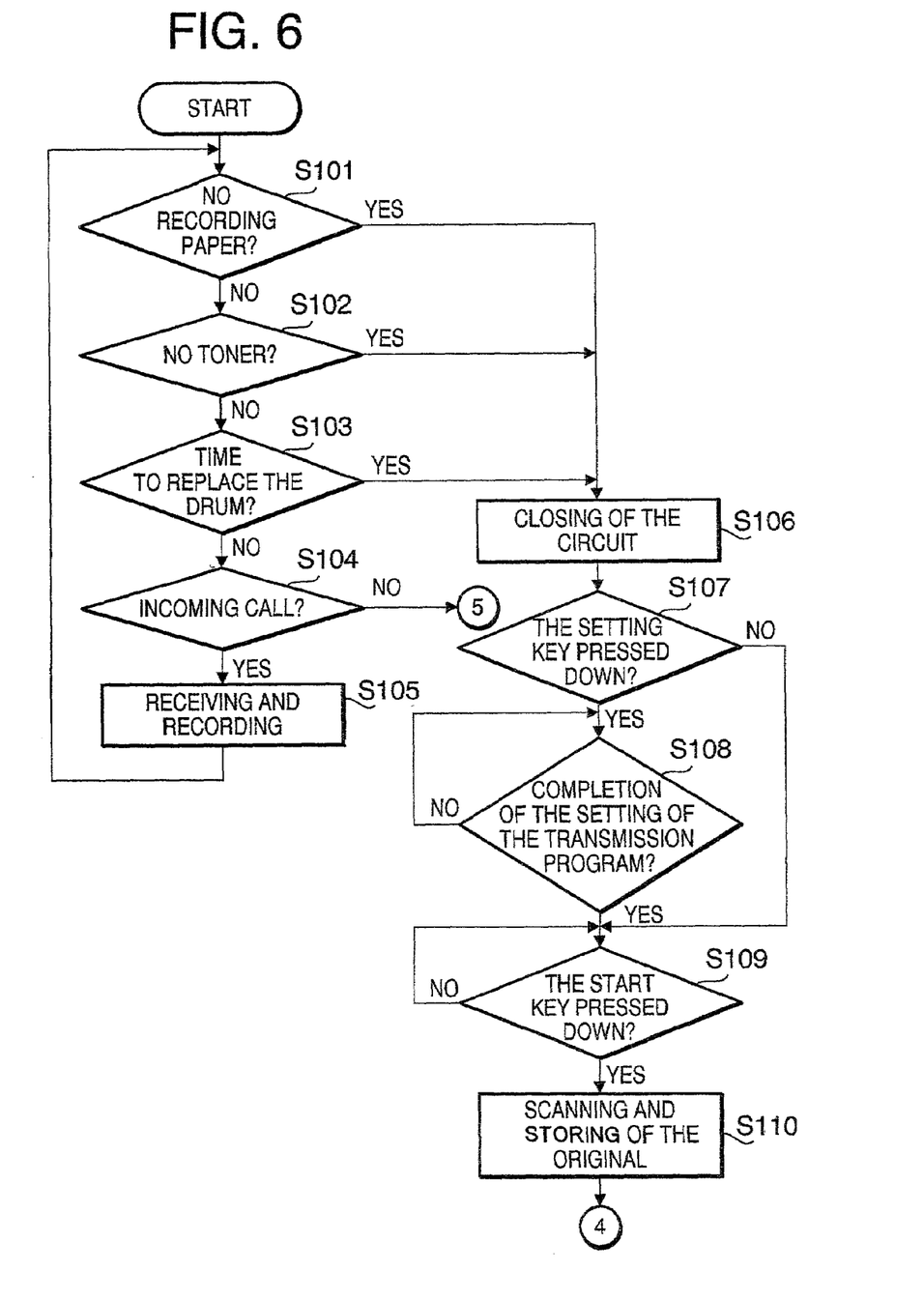
FIG. 6 is another flow chart showing the operation of the facsimile device with a copying function shown in FIG. 1 in the event that the recording unit fails to operate.

In S6 shown in FIG. 3, the memory overflow is detected. If there is no memory overflow, alternative receiving is carried out. However, as shown in FIG. 6 to be mentioned later on, in the case S6 is not considered and any of S1, S2, S3 detects the condition incapable of recording, the alternative receiving may not be carried out and the circuit may be closed in S9. If constituted likewise, it is possible to prevent images from piling up in the memory. Moreover, since the image for transmission can be stored in the image memory, in S13, the image can be scanned and stored in the image memory. In this case, the original image is read from the image memory and transmitted in S51.

Figure 7:
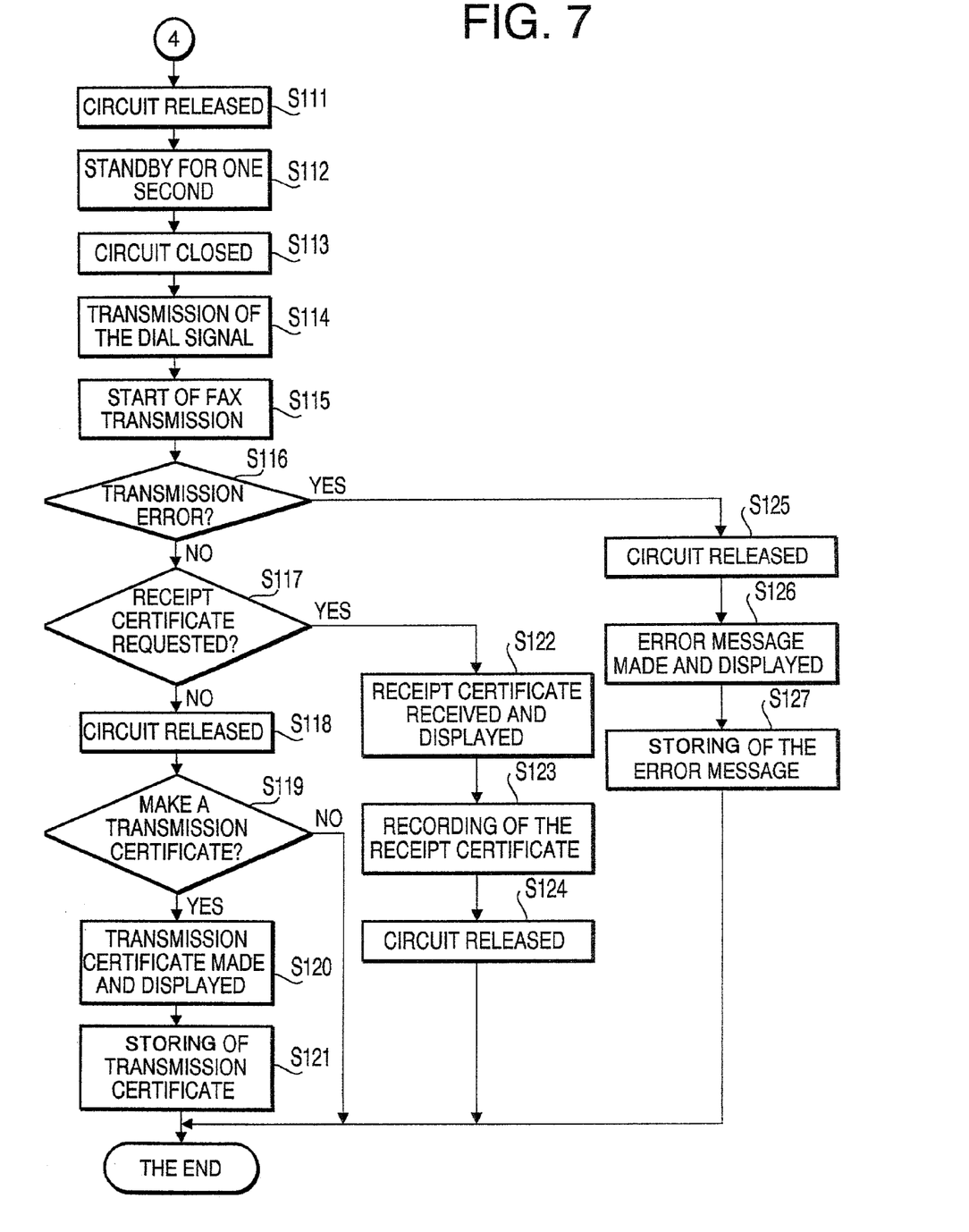
FIG. 7 is a flow chart following the flow chart of FIG. 6.
Figure 8:
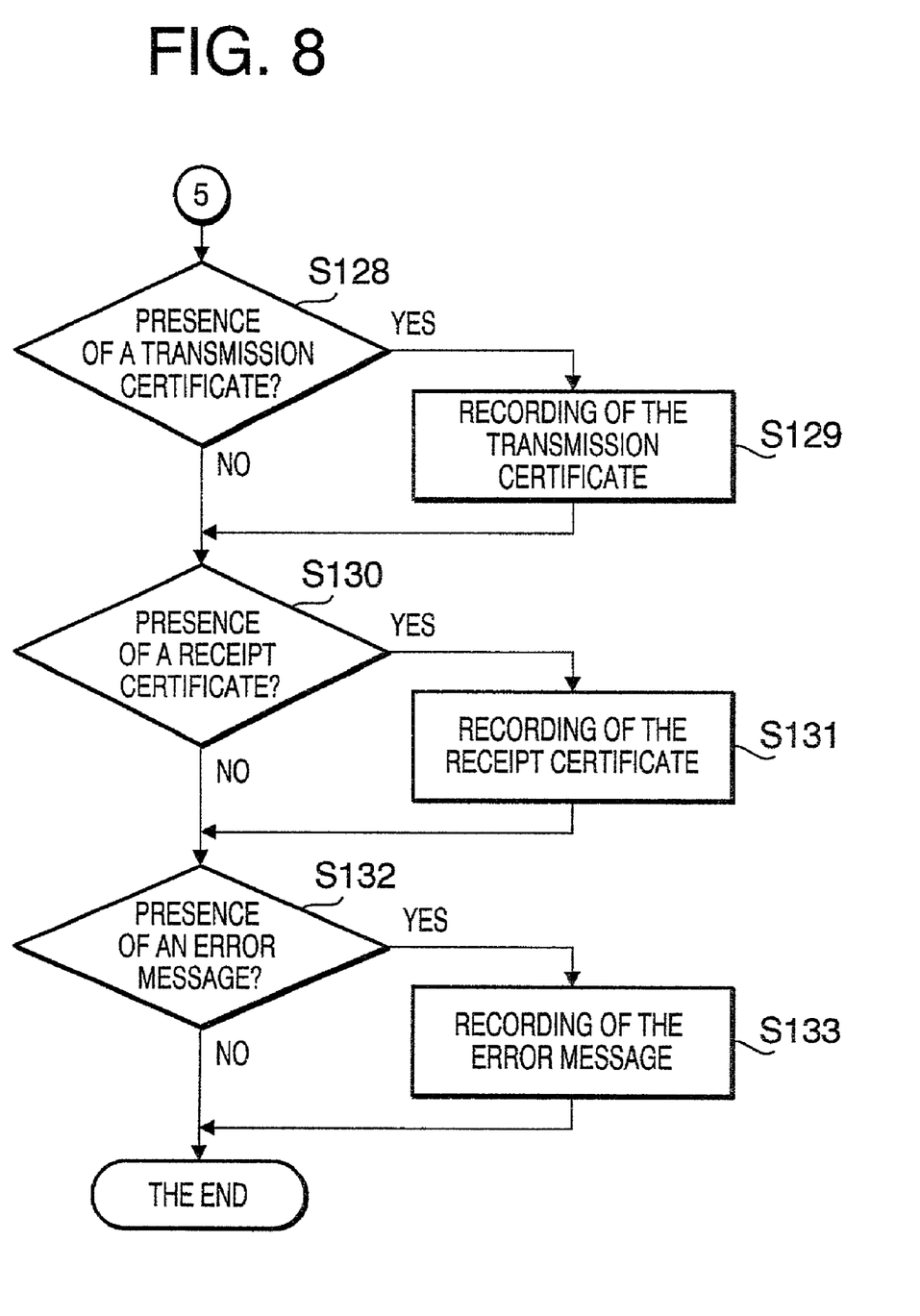
FIG. 8 is a flow chart following the flow chart of FIG. 6.

Referring to the flow charts shown in FIG. 6 through FIG. 8, the operation of the facsimile device 1 with a copying function as a second embodiment of the present invention in the case the recording unit 50 fails to operate, is now to be described. This operation is carried out by the control of the MPU 10, in accordance with the program stored in the ROM 20.

In step S101, the presence or the absence of recording paper is checked in accordance with the detecting signal from recording paper sensor 51. When there is no recording paper, it proceeds to step S106. On the other hand, when there is a recording paper, it proceeds to step S102.

In step S102, the presence or the absence of a toner is checked, according to the detecting signal from a toner sensor 52. When there is no toner, it proceeds to step S106. On the other hand, when there is a toner, it proceeds to step S103.

In step S103, it is judged whether or not the photoconductive drum has reached the time to be replaced in accordance with the detecting signal from the drum sensor 53. When the photoconductive drum has reached the time to be replaced, it proceeds to step S106. On the other hand, when the photoconductive drum has yet to reach the time to be replaced, it proceeds to step S104.

In step S104, it is judged whether or not there has been an incoming call by the facsimile communication based on the CNG signal. When there has been an incoming call, it proceeds to step S105. When the CNG signal which shows that the call has been sent from the facsimile device, is transmitted from the other end and the facsimile communication starts following the facsimile transmission controlling procedure, the image data is received and the received image data is recorded on recording paper at the recording unit 50 in step S105, and it proceeds to the step S101. In other words, when there are recording paper and a toner, and the photoconductive drum has yet to reach the time to be replaced, the process of the step S101 through step S105 is repeated. On the other hand, when there is no incoming call, it proceeds to step S128 shown in FIG. 8.

In step S106, the telephone line L is closed by the CML relay 112 when the recording unit becomes non-operable in the case recording paper or a toner runs out, or in the case the photoconductive drum has reached the time to be replaced. In other words, when the recording unit 50 fails to operate, the image data cannot be recorded immediately by the recording unit 50. Therefore, when the recording unit 50 fails to operate, the telephone line L is closed so that an incoming call of the facsimile communication is not received.

The MPU 10 stores, in the RAM 30, the FAX number of the other end in the case the transmitting original is placed on the scanning unit 40 by the transmitter in the above situation and when the FAX number of the other end is input by the ten-key numerical pad 64 or when the other end is specified by the speed dialing/telephone directory key 62 or the one touch key 63.

In step S107, it is judged whether or not the transmitter has pressed down the setting key 66 for setting the date and time of transmission. When the setting key 66 is pressed down, it proceeds to step S108. On the other hand, when the setting key 66 is not pressed down, it proceeds to step S109.

In step S108, the waiting state continues until the setting of the transmission program is completed. More specifically, "the date and time of transmission", "the FAX number of the other end", or "the FAX type such as confidential or multiple address" can be given as the examples for the setting of the transmission program. When the setting of the transmission program completes, it proceeds to step S109. In other words, when the content of the transmission program is input by the transmitter with the ten-key numerical pad 64, for example, the MPU 10 stores the content of the transmission program in the RAM 30.

In step S109, the waiting state continues until the transmitter presses the start key 65. When the start key 65 is pressed down, it proceeds to step S110. If the transmitting original is removed, or if the start key 65 is not pressed within prescribed period of time, the date and time of transmission set in step S108 is cleared, and it returns to step S101.

In step S110, the scanning unit 40 scans the image on the transmitting original, and the image data of the image is stored in the image memory 80. In step S111 shown in FIG. 7, the telephone line L is released by the CML relay 112. In other words, after the transmitting original is placed and the other end is specified by the transmitter, and the transmission program is set, if the start key 65 is pressed down, the telephone line L is released by the CML relay 112 with the arrival of the programmed date and time of transmission. On the other hand, in the case the setting key 66 is not pressed down by the transmitter in the step S107 and the start key 65 is pressed down in the step S109, the setting is judged as an immediate transmission and the telephone line L is released by the CML relay 112.

In step S112, it is on standby for one second with the telephone line L being released by the CML relay 112. In other words, when the telephone line L is kept closed for a long period of time, the exchanger (PBX) recognizes that the facsimile device 1 with a copying function is using the telephone line L, and the dial signal from the dial signal producing circuit 114 is not accepted thereafter. Therefore, the telephone line L is being released by the CML relay 112 for one second.

In step S113, the telephone line L is closed by the CML relay 112 again. In step S114, the FAX number of the other end is read from the RAM 30, and the dial signal corresponding to the FAX number is sent out from the dial signal producing circuit 114 to the telephone line L.

In step S115, the image data is read out from the image memory 80 and the FAX transmission of the image data is started. In step S116, it is judged whether or not the transmission error has occurred. When the transmission error has not occurred, in other words, when the FAX transmission has been completed without problem, it proceeds to step S117. On the other hand, in the case the DIS signal, the MCF signal which is the response signal of the MPS signal, or the MCF signal which is the response signal of the EOP signal is not transmitted from the facsimile device of the other end in the midst of the facsimile transmission control procedure, it is judged that a transmission error has occurred and it proceeds to step S125.

In step S117, it is judged whether or not a receipt certificate should be requested to the facsimile device of the other end in accordance with the setting of the setting key 66. When not requesting a receipt certificate, it proceeds to step S118. On the other hand, when requesting a receipt certificate, it proceeds to step S122.

In step S118, the telephone line L is released by the CML relay 112. In step S119, it is judged whether or not the transmission certificate should be made in accordance with the setting of the setting key 66. When making the transmission certificate, it proceeds to step S120. On the other hand, when not making the transmission certificate, this process is terminated.

In step S120, the transmission certificate including each of the items of the date and time of transmission, the name of the other end, the FAX number of the other end, and the number of pages to be transmitted, is made in text data and is displayed on the display unit 70. In other words, the ROM 20 stores an editor view program to display the text data.

In step S121, the RAM 30 stores the transmission certificate made in step S120, and this process is terminated. When requesting a receipt certificate in the step S117, a receipt certificate including image data is made by the facsimile device of the other end in step S122. Then the MPU 10 carries out so-called turnaround polling in which the facsimile device 1 with a copying function which was previously on the transmitting side is switched to be on the receiving side, and the facsimile device of the other end which was previously on the receiving side is switched to be on the transmitting side. In other words, the MPU 10 receives the receipt certificate made by the facsimile device of the other end which is now the transmitting side, and the receipt certificate is displayed on the display unit 70. Thus, the ROM 20 is storing the viewer program to display the image data. Even when the recording unit 50 fails to operate, to check that the facsimile communication with the other end has been carried out normally, a receipt certificate is received and is displayed on the display unit 70.

In step S123, the receipt certificate received in step S122 is stored in the image memory 80. In step S124, the telephone line L is released by the CML relay 112 and this process is terminated.

In the case the transmission error occurs in the step S116, the telephone line L is released by the CML relay 112 in step S125. In step S126, the error message including the date and time of transmission, the name of the other end, the FAX number of the other end, the error message and the number of pages transmitted, is made in text data and is displayed on the display unit 70.

In step S127, the error message made in step S126 is stored in the RAM 30 and this process is terminated. Next, in the case "NO" is selected in the step S104, in other words, when recording paper or a toner is replenished by an operator, or when the photoconductive drum is replaced by a service personnel and the recording unit 50 becomes capable of operating, in step S128 shown in FIG. 8, it is judged whether or not the transmission certificate is stored in the RAM30. When the transmission certificate is stored in the RAM30, it proceeds to step S129. On the other hand, when the transmission certificate is not stored in the RAM 30, it proceeds to step S130.

In step S129, the transmission certificate is read from the RAM 30, the transmission certificate in text data is converted into an image data, and the image data is recorded on recording paper in the recording unit 50. In step S130, it is judged whether or not the receipt certificate is stored in the image memory 80. When the receipt certificate is stored in the image memory 80, it proceeds to step S131. On the other hand, when the receipt certificate is not stored in the image memory 80, it proceeds to step S132.

In step S131, the receipt certificate is read from the image memory 80 and is recorded on recording paper in the recording unit 50. In step S132, it is judged whether or not an error message is stored in the RAM 30. When an error message is stored in the RAM30, it proceeds to step S133. On the other hand, when the error message is not stored in the RAM30, this process is terminated.

In step S133, the error message is read from the RAM30, the error message in text data is converted into an image data and the image data is recorded on recording paper in the recording unit 50.

According to the embodiment of the first invention described above, the following processes and effects can be expected.

(1) In the case the recording unit 50 fails to operate and the image memory 80 is exhausted, the telephone line L is closed by the CML relay 112 and the FAX receiving by the facsimile communication is rejected. Then, in the case the transmission program (including immediate transmission) or the polling program are selected, when the transmission program job or the polling program job reaches the date and time of transmission or the date and time of calling, the telephone line L is released temporarily by the CML relay 112 and the other end is being called out. As a result, even in the case the recording unit 50 fails to operate and the image memory 80 is exhausted, the other end can be called out. Thus, even in the case the recording unit 50 fails to operate and the image memory 80 is exhausted, the facsimile transmission can be carried out.

(2) When calling the other end by releasing the telephone line L by the CML relay, in the case an incoming call is detected, it is judged whether or not the CNG signal has been received by the modem 100. When the CNG signal is received, in other words, when it is an incoming call of the facsimile communication, since the recording unit 50 fails to operate, the telephone line L is released forcibly by the CML relay 112. Then, the telephone line L is closed to originate a call to the other end. Thus, in the case of calling the other end by releasing the telephone line L, even when the FAX receiving by the facsimile communication is detected, it is possible to originate a call to the other end. On the other hand, when the CNG signal is not received, it is judged as an incoming call from a telephone and the ringing tone is ringed from the ringing unit 120, based on the calling signal. Thus, in the case the recording unit 50 fails to operate and the image memory 80 is exhausted, the incoming call from the telephone can be answered. In other words, the telephone line L is not being released for more than its necessity. Thus, the telephone line L can be used effectively.

(3) In the case the calling based on an incoming call is set not to be interrupted, when the ringing tone from the ringing unit 120 based on the incoming call is stopped, in other words, when the calling side stopped the calling the telephone line L is closed by the CML relay 112 and the other end is called. As a result, when the calling from the calling side is stopped, the facsimile transmission can be carried out rapidly. Thus, even in the case the recording unit 50 fails to operate and the image memory 80 is exhausted, the facsimile transmission can be carried out.

(4) Even in the case the recording unit 50 fails to operate and the image memory 80 is exhausted, the setting of the transmission program (including immediate transmission) as a transmitting job can be done at all times. Therefore, when the setting of the transmission program is carried out, the transmission program job is registered at queue 31. Thus, when the transmission program job reaches the date and time of transmission, the calling can be carried out to the other end based on the job.

(5) The polling program as a receiving job can be accepted in accordance with the setting for accepting the polling program based on the operation of the setting key 66. Therefore, when the setting for accepting the polling program is selected, as not to accept the polling program, the polling program cannot be carried out. Thus, the fact that the facsimile device 1 with a copying function is incapable of receiving, in other words, the fact that the recording unit 50 fails to operate and the image memory 80 is exhausted, can be informed.

(6) On the other hand, when the polling program based on the operation of the setting key 66 is set to be accepted, the setting of the polling program can be done at all times. Therefore, when the polling program is set, the polling program job is registered at queue 31. Thus, when the polling program job reaches the calling date and time after the cause of the malfunction of the recording unit 50 has been solved, the other end based on the job can be called.

(7) Moreover, the polling by the polling program is carried out after the cause of the malfunction of the recording unit 50 has been solved. Therefore, even when the polling is carried out, the received image data by the polling can certainly be recorded on recording paper in the recording unit 50. Thus, even if the polling by the polling program is carried out, it is impossible for problems to occur.

(8) Even when the recording unit 50 fails to operate and the image memory 80 is exhausted, the transmission program (including immediate transmission) can be set at all times. In addition, when the polling program based on the operation of the setting key 66 is able to be accepted, the setting of the polling program can be done at all times. As a result, the transmission program or the polling program are not forgotten to be set.

The embodiment described above can be changed as in the followings and made more concrete.

In the case the recording unit 50 fails to operate and the image memory 80 is exhausted, it can be constituted to display this fact on the display unit 70 and to display the fact that the transmission program is practicable, on the display unit 70. If constituted likewise, the user can be informed that the transmission program is practicable.

In addition, even when it is set to accept the polling program, it can be constituted to display the fact that the polling program is practicable on the display unit 70. If constituted likewise, the user can be informed that the polling program is practicable.

The embodiment described above can be applied to the facsimile device 1 with a copying function not employing the image memory 80. If constituted likewise, the facsimile transmission can be carried out even in the case the recording unit 50 fails to operate.

It can be constituted to check whether or not it is the time for the photoconductive drum to be replaced, based on the driving time of the motor for rotating and driving the photoconductive drum, adding to the drum sensor 53 which detects the rotation of the photoconductive drum.

The embodiment described above can also be applied to the facsimile device with only the main body. Moreover, the technical ideas grasped by the first embodiment described above, not listed in the claims, and its advantages is now to be described.

A communication terminal employing a displaying means for displaying the fact that the job can be registered, and a control means which displays on the displaying means the fact the job can be registered in the case the recording means has become non-operable. If constituted likewise, even when the recording means has become non-operable, the user can be informed that the user can register a job.

The following processes and advantages can be expected in the second embodiment.

(1) When the FAX transmission is completed without problem, the transmission certificate is made in accordance with the setting of the setting key 66 and the receipt certificate from the facsimile device of the receiving side is received. On the other hand, in the case a transmission error occurs, the error message is made. Then, the transmission certificate, the receipt certificate, or the error message is displayed on the display unit 70. Thus, even when the recording unit 50 becomes non-operable while the FAX transmission is in process, the communication result of the transmission certificate, the receipt certificate or the error message can be checked quickly by looking at the display unit 70.

(2) In addition, the transmission certificate and the error message are stored in the RAM 30, and the receipt certificate is stored in the image memory 80. In the case the recording unit 50 becomes operable, the recording unit 50 records the transmission certificate, the receipt certificate or the error message. Therefore, even in the case these communication results could not be checked at the display unit 70, the results can be checked by the recording on recording paper. Thus, these communication results can be checked for sure.

(3) The transmission certificate and the error message are made in text data of which the storing region is smaller than the storing region of image data, and are stored in the RAM 30. Therefore, comparing with the case in which the image data is stored, the storing capacity of the RAM 30 can be smaller. Thus, the case in which the recording unit 50 fails to operate for a long period of time and there is a need for the RAM 30 to store many transmission certificates and error messages can be dealt with. Accordingly, the RAM 30 can be used effectively.

(4) To check that the facsimile communication with the receiving side has been carried out normally, the receipt certificate is received by the turnaround polling. Therefore, the payment occurs at the transmitting side. Thus, the receiving side is not charged with the communication expenses.

The second embodiment described above may be modified as in the followings.

In the second embodiment described above, the facsimile device is constituted such that the transmission certificate and the error message are made in text data and stored in the RAM 30. However, the facsimile device may be constituted such that the transmission certificate and the error message are made in image data and stored in the image memory 80. If constituted likewise, unlike the second embodiment described above, since there is no need for the text data to be converted into an image data, the transmission certificate and the error message can be recorded in a short period of time.

In the embodiment described above, the communication terminal is applied to the facsimile device 1 with a copying function, but the communication terminal may also be applied to a simple facsimile device without copying function.

In the second embodiment described above, the facsimile device is constituted such that the transmission certificate, the receipt certificate, and the error message are displayed on the display unit 70. However the facsimile device may be constituted such that the communication results are informed in sound by employing the ringing unit 120 which informs these communication results in sound.

The facsimile device may be constituted such that these communication results are not recorded on recording paper, when the transmission certificate, the receipt certificate and the error message are displayed on the display unit 70 and a prescribed key (for example, a clear key) is pressed down. In other words, the communication results can be invalidated so as not to be recorded. If constituted likewise, when the user checks the communication result on the display unit 70, the communication result is not recorded on recording paper. Thus, the unnecessary consumption of recording paper can be prevented.

In addition, the facsimile device may be constituted such that the communication results are erased from the RAM 30 or the image memory 80, when the transmission certificate, the receipt certificate and the error message are displayed on the display unit 70, and a prescribed key (for example, a clear key) is pressed down.

The facsimile device may be constituted such that it is judged whether or not it is the time for the photoconductive drum to be replaced, in accordance with the driving time of the motor for rotating and driving the photoconductive drum, instead of the drum sensor 53 which detects the rotation of the photoconductive drum.

Moreover, the technical ideas grasped by the second embodiment described above, not listed in the claims, and its advantages are now to be described.

(1) A communication terminal including invalidating means which invalidates the recording of the communication results by the recording means, and a control means which prohibits the communication results from being recorded in the recording means when the invalidating means has been operated in accordance with the informing of the informing means, in the communication terminal described above. If constituted likewise, the unnecessary consumption of recording paper can be prevented.

(2) In the communication terminal described in (1) above, the communication terminal includes control means which erases the communication results stored in the storing means in the case the invalidating means is operated in accordance with the informing of the informing means. If constituted likewise, the available capacity of the storing means can be quickly ensured.

Even when the recording unit becomes non-operable while the transmission is in process, the communication result can be quickly checked.

What is claimed is:

1. A communication terminal comprising:
a network control unit for closing and releasing a circuit;
a memory for registering a communication job;
a recording unit for recording image data on a recording medium; and
a control unit which closes the circuit by the network control unit to make acceptance of an incoming call impossible as long as the recording unit fails to operate, and which releases the circuit temporarily by the network control unit in the case of an outgoing facsimile transmission.

2. The communication terminal according to claim 1 further including an image memory, wherein the control unit makes acceptance of the incoming call impossible when the recording unit fails to operate and the image memory cannot store an image.

3. The communication terminal according to claim 1, wherein after the control unit makes the network control unit release the circuit temporarily, the control unit makes the network control unit close the circuit again when the incoming call is detected.

4. The communication terminal according to claim 1, wherein the control unit makes the network control unit close the circuit again when the calling signal based on the incoming call ends in the case the incoming call is detected after the control unit makes the network control unit release the circuit temporarily, and then a call to the other end is originated.

5. The communication terminal according to claim 1, wherein after the control unit makes the network control unit release the circuit temporarily, the control unit makes the network control unit close the circuit again when the incoming call is detected, and makes the network control unit release the circuit when a CNG signal is received.

6. The communication terminal according to claim 1, wherein it is impossible to register a receiving job in the memory when the communication terminal is in the state in which the communication terminal cannot receive data from a sending side.

7. The communication terminal according to claim 1 further including a display unit for displaying result information of the facsimile transmission.

8. The communication terminal according to claim 1 further including a transmission result memory, wherein the control unit makes the transmission result memory store the result information of the facsimile transmission therein.

9. The communication terminal according to claim 8 wherein the control unit reads the result information of the facsimile transmission from the transmission result memory, and makes the recording unit record the result information of the facsimile transmission when the recording unit becomes operable.

10. A communication terminal comprising:
a network control unit for closing and releasing a circuit;
a program memory for registering a facsimile transmission job;
a recording unit for recording image data on a recording medium; and
a control unit which closes a circuit by the network control unit so that an incoming call is not accepted as long as the recording unit fails to operate, and releases the circuit temporarily by the network control unit when the facsimile transmission job registered in the program memory reaches calling time.

11. The communication terminal according to claim 10, further including a display unit for displaying result information of the facsimile transmission job.

12. The communication terminal according to claim 10, wherein the control unit causes a call to the other end for transmitting an image after the control unit makes the network control unit release the circuit temporarily.

13. The communication terminal according to claim 10, wherein the control unit registers the facsimile transmission job in the program memory and does not register a receiving job in the program memory.

14. The communication terminal according to claim 10, wherein the control unit makes the program memory register the facsimile transmission job and a receiving job therein, and causes the receiving job to be carried out when the recording unit becomes operable.

15. The communication terminal according to claim 10, further including an image memory, wherein the control unit makes acceptance of the incoming call impossible when the recording unit fails to operate and the image memory cannot store an image.

16. The communication terminal according to claim 10, further including an image memory for storing an image corresponding to the facsimile transmission job therein, wherein the control unit makes acceptance of the incoming call impossible when the recording unit fails to operate.

17. The communication terminal according to claim 10, wherein the recording unit becomes non-operable when recording paper or a toner runs out.

18. The communication terminal according to claim 10, wherein on the basis of the rotating time of the photoconductive drum, it is judged whether or not the recording unit is non-operable.

19. The communication terminal according to claim 10, wherein when a receiving job is registered in the program memory, the registered receiving job which has reached calling time is carried out after the cause for the malfunction of the recording unit is solved.

20. The communication terminal according to claim 10, wherein when the facsimile transmission job has been carried out without a problem, the communication terminal receives a receipt certificate from the receiving side.

* * * * *